United States Patent
Ervin et al.

(10) Patent No.: US 9,130,866 B2
(45) Date of Patent: Sep. 8, 2015

(54) TRANSPARENT FLOW BASED APPLICATION NAVIGATOR

(71) Applicant: Cisco Technology, Inc., San Jose, CA (US)

(72) Inventors: Jim Ervin, San Jose, CA (US); Arivu Mani Ramasamy, San Jose, CA (US); Tom Black, San Jose, CA (US); Venkataraman Anand, San Jose, CA (US); Scott Alexander, San Jose, CA (US); Steven Rempe, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 175 days.

(21) Appl. No.: 13/802,118

(22) Filed: Mar. 13, 2013

(65) Prior Publication Data
US 2014/0269741 A1    Sep. 18, 2014

(51) Int. Cl.
| | |
|---|---|
| *H04L 12/725* | (2013.01) |
| *H04L 12/721* | (2013.01) |
| *H04L 12/24* | (2006.01) |
| *H04L 12/741* | (2013.01) |
| *H04L 12/46* | (2006.01) |
| *H04L 12/54* | (2013.01) |
| H04L 12/761 | (2013.01) |
| H04L 12/707 | (2013.01) |
| H04L 12/713 | (2013.01) |
| H04L 12/931 | (2013.01) |
| H04L 29/06 | (2006.01) |

(52) U.S. Cl.
CPC .............. *H04L 45/306* (2013.01); *H04L 45/38* (2013.01)

(58) Field of Classification Search
CPC ............ H04L 67/1002; H04L 67/1023; H04L 45/306; H04L 45/308; H04L 45/38; H04L 41/24; H04W 8/18
USPC ........... 370/236, 315, 389, 401; 709/203, 226
See application file for complete search history.

(56) References Cited

U.S. PATENT DOCUMENTS

| | | | |
|---|---|---|---|
| 2008/0177896 A1* | 7/2008 | Quinn et al. | 709/238 |
| 2012/0002672 A1* | 1/2012 | Alexander, Jr. et al. | 370/392 |

* cited by examiner

*Primary Examiner* — Un C Cho
*Assistant Examiner* — Peian Lou
(74) *Attorney, Agent, or Firm* — Hickman Palermo Becker Bingham LLP

(57) ABSTRACT

In one embodiment, a network frame is received at flow aware navigator between a client computer and a server computer. The flow aware navigator is configured to determine whether the network frame should be forwarded to one or more network services for processing before forwarding the network frame to the server computer. If the flow aware navigator determines that the network frame should be forwarded to one or more network services for processing before forwarding the network frame to the server computer, the flow aware navigator forwards the network frame to the one or more network services for processing. In response to receiving the processed network frame from the network services, the flow aware navigator then forwards the processed network frame to the server computer.

24 Claims, 5 Drawing Sheets

TRANSPARENT FLOW BASED APPLICATION NAVIGATOR

TECHNICAL FIELD

The present disclosure relates generally to computer networks, and more specifically relates to intercepting and forwarding network flows that are traversing networks.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

In data processing networks, routers, switches, servers and other network elements process network frames. A network flow comprises of one or more network frames typically having the same five-tuple of source address, destination address, source port number, destination port number, and protocol identifier. A network flow can be established between two networking devices associated with a client computer and a server computer.

Adding services to a network in a transparent fashion is not easily accomplished with current technology. Routers in present networks typically route packets based on the network address of a destination computer, and there is no simple technique to add, in the middle of the packet flow between client and server or other endpoint devices, computers to perform services. Routers and switches forward packets individually rather than making decisions based upon characteristics of a connection, and forwarding decisions are primarily driven by the value of the destination address. Consequently, if a network administrator wishes to configure the network to route or switch a frame through a service device before the frame reaches the endpoint destination address, few techniques are available.

Filters or policy-based routing do not implement decision-making based upon flows. Certain firewalls or load balancers, such as the ACE device commercially available from Cisco Systems, Inc., San Jose, Calif., focus on the destination address of a server computer and do not perform selection of a next hop based upon flow characteristics.

SUMMARY OF THE INVENTION

The appended claims may serve as a summary of the invention.

DESCRIPTION OF EXAMPLE EMBODIMENTS

Figure 1:
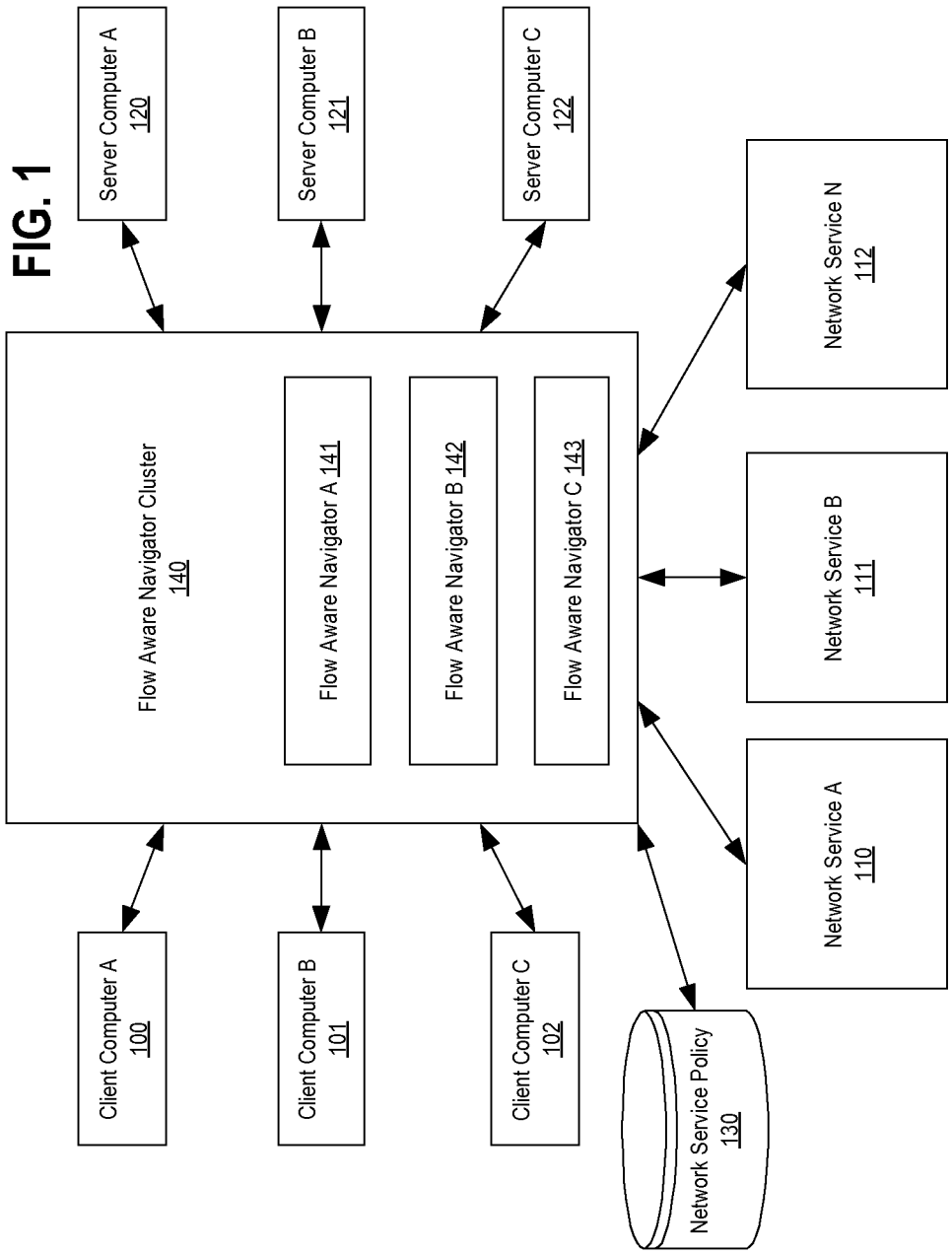
FIG. 1 illustrates an example computer-networking environment upon which an embodiment may be implemented.

Techniques for automatically routing network frames toward one or more network services based upon flow characteristics are described. In the following descriptions, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Several features are described hereafter that can each be used independently of one another or with any combination of other features. However, any individual feature may not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in the specification.

Embodiments are described herein according to the following outline:
General Overview
Example Flow Aware Navigator System
Example Flow Aware Navigator
Methods
Receiving a frame from a known network flow
Receiving a frame from an unknown network flow
Hardware Overview
1.0 General Overview In one embodiment, a network frame originating from a first endpoint and directed to a second endpoint is received at a flow aware navigator that is interposed between the first endpoint and the second endpoint. For purposes of convenience, the term "flow aware navigator" is used to identify a computing device that implements certain techniques herein, but use of the label "flow aware navigator" is not required for embodiments. In response to receiving a network frame from the first endpoint, the flow aware navigator may extract or otherwise obtain information from the network frame. The extracted information is then matched against entries within a flow database. The flow database may comprise information indicating one or more network services to which a network frame should be forwarded for processing before the processed network frame is forwarded to the second endpoint. If the information associated with the network frame is found within the flow database, the flow aware navigator forwards the network frame to the one or more network services instead of toward the second endpoint. After the one or more network services process the network frame, the network services forward the processed network frame back to the flow aware navigator. In response to receiving the processed network frame, the flow aware navigator forwards the processed network frame toward the second endpoint.

In another embodiment, the extracted information that is associated with the network frame is not found within the flow database, the flow aware navigator may interact with one or more other flow aware navigators within a cluster of flow aware navigators to seek information associated with the network frame. If the information associated with the network frame is found via another flow aware navigator, and the information indicates that one or more network services should process the network frame before forwarding the processed network frame toward the second endpoint, the flow aware navigator that received the network frame updates its flow database with the information associated with the network frame. The flow aware navigator then forwards the network frame to the one or more network services for processing. The one or more network services process the network frame and forward the processed network frame back to the first flow aware navigator. In response to receiving the processed network frame, the flow aware navigator forwards the processed network frame toward the second endpoint.

In another embodiment, the information associated with the network frame is not found via any of the other flow aware navigators. The first flow aware navigator may determine, from a predefined or user-selected set of network policies, one or more network services to which the network frame should be forwarded for processing before forwarding the processed network frame toward the second endpoint.

In one embodiment, the network services are configured to process the network frame in a serial chain. In an alternative embodiment, the network services are configured to process the network frame in one or more parallel chains.

In one embodiment, the network services may process the network frames sent from the client to the server as well as the network frames sent from the server to the client. In another embodiment, the network services may process the network frames sent only by the client to the server but not the network frames sent by the server to the client.

2.0 Example Flow Aware Navigator System

FIG. 1 illustrates an example computer networking environment with which an embodiment may be implemented. Each of the elements depicted within FIG. 1 are shown for clarity and may not be necessary to implement a particular embodiment. Furthermore, elements not shown in FIG. 1 may also be used to perform the functions described herein. In addition, functions described as performed by one element may also be performed by a different element. Although only a particular number of each element is depicted within FIG. 1 for purposes of illustrating a clear example, a practical environment may have many more, perhaps even hundreds or thousands, of each of the elements depicted within FIG. 1.

In one embodiment, a flow aware navigator cluster 140 is communicatively coupled to one or more client computers 100, 101, 102, one or more server computers 120, 121, 122, one or more network services 110, 111, 112, and a network service policy 130, which may be implemented on a separate computer. In one embodiment, one or more of the client computers 100, 101, 102 may transfer messages as part of a network frame to the one or more of the server computers 120, 121, 122. The network frames from the one or more of the client computers pass through the flow aware navigator cluster 140 as a hop along a routing path between the one or more of the client computers 100, 101, 102 and the one or more of the server computers 120, 121, 122. In one embodiment, cluster 140 comprises one or more flow aware navigators 141, 142, 143 that are interposed between one or more of the client computers 100, 101, 102, one or more of the server computers 120, 121, 122, one or more of the network services 110, 111, 112, and the network service policy 130. In another embodiment, one or more of the flow aware navigators 141, 142, 143 are configured to intercept and forward the network frames transmitted between the one or more of the client computers 100, 101, 102, the one or more of the server computers 120, 121, 122 and the one or more of the network services 110, 111, 112.

In one embodiment, the one or more flow aware navigators 141, 142, 143 may be logically or physically located at network entrance and exit points of the one or more of the client computers 100, 101, 102, the one or more of the server computers 120, 121, 122 or the one or more of the network services 110, 111, 112. In one approach, every network entrance point and every network exit point could be configured in this manner.

In one embodiment, flow aware navigator cluster 140 is communicatively coupled to one or more of the client computers 100, 101, 102, one or more of the server computers 120, 121, 122, one or more of the network services 110, 111, 112, and network service policy 130 by any combination of one or more local area networks (LAN), wide area networks (WAN), internetworks or a portion of the Internet. Network frames exchanged between the flow navigator cluster 140, one or more of the client computers 100, 101, 102, one or more of the server computers 120, 121, 122, one or more of the network services 110, 111, 112, and the network service policy 130, may be transferred using any number of datagram layer or network layer protocols, such as Internet Protocol (IP), Transmission Control Protocol (TCP), User Datagram Protocol (UDP), Multiprotocol Label Switching (MPLS), Asynchronous Transfer Mode (ATM), and Frame Relay. Furthermore, in an embodiment, different network layer protocols may be used at each of the underlying networks.

In one embodiment, one or more of the flow aware navigators 141, 142, 143 are part of an internetworking infrastructure element such as a switch, router, or gateway configured for forwarding network packets. In another embodiment, one or more of the flow aware navigators 141, 142, 143 are standalone network devices or other computing devices that have been configured to intercept and forward network frames. For example, one or more of the flow aware navigators may comprise a network device equipped with Wide Area Application Services, commercially available from Cisco Systems, Inc., San Jose, Calif.

In one embodiment, network service policy 130 comprises a list of network policies indicating a set of one or more network services that should process a particular network frame. In one embodiment, network service policy 130 may specify or determine network services that should process a particular network frame based on the type of network traffic in the particular network frame. Examples of network traffic may include voice over Internet Protocol (VoIP), multimedia, FTP, HTTP, or others. In an alternative embodiment, network service policy 130 may determine network services that should process a particular network frame based on geographical origination of the network frame. For example, network service policy 130 may determine that one or more of the flow aware navigators 141, 142, 143 should redirect a particular network frame to a network service located in Europe based on the fact that the network frame originated from a client computer in Europe. In another embodiment, network service policy 130 may determine that network services that should be applied to a particular network frame based on the port of the connection. For example, a network connection on port 443 commonly indicates that the network connection is a secure Hypertext Transfer Protocol (HTTPS) connection. Network policy may determine that the network frame established on port 443 should be forwarded to the one or more network services that can process the HTTPS connection. In another embodiment, network service policy 130 may determine that network services that should process a particular network frame based on destination address. In an alternative embodiment, network service policy 130 may determine that network services that should process a particular network frame based a combination of the above criteria.

In one embodiment, network service policy 130 comprises a set of preset network policies that indicate one or more network services that should process a particular network frame. In another embodiment, an administrator of the network service policy, or an administrator of the network may modify the network policies within the network service policy 130.

In one embodiment, the one or more of the network services 110, 111, 112 may be configured to process a network frame in serial. In a serial chain, the network frames are transferred and processed to multiple services in a particular order; an example of an order is from the network service 110 to network service 111. When network service 110 receives a network frame from one or more of the flow aware navigators 141, 142, 143 for processing, the network service 110 sends the processed network frame back to the particular flow aware navigator 141, 142, 143, after which the received network frame is then forwarded to network service 111 for processing. In one embodiment, the network service 110 can process the network frame and then send the processed network frame directly to network service 111 without forwarding the network frame back to the flow aware navigators 141, 142, 143.

In one embodiment, the flow aware navigators 141, 142, 143 and the one or more of the network services 110, 111, 112 may be configured to process a network frame in parallel. With a parallel chain, the network frame is copied at one of the flow aware navigators 141, 142, 143 and copies of the network frames are sent to two or more of the network services 110, 111, 112 at the same time. In one embodiment, a network service 110, 111, 112 may consume the network frame without returning the network frame to the flow aware navigator 141, 142, 143. For example, a network service 110, 111, 112 that collects network statistics may consume the received network frame without returning the processed network frame back to the flow aware navigator 141, 142, 143. In an alternative embodiment, the network frame is copied and sent to two or more of the network services 110, 111, 112 at the same time, where both of the network services will process the network frame and send the processed network frames back to the flow aware navigator 141, 142, 143.

In one embodiment, the one or more of the network services 110, 111, 112 may issue commands to the one or more of the flow aware navigators 141, 142, 143. The network services 110, 111, 112 may command the flow aware navigators 141, 142, 143 to stop forwarding network frames of a particular network flow to the network services. In another embodiment, the network services 110, 111, 112 may send network service load balance information to the flow aware navigators 141, 142, 143. The flow aware navigators 141, 142, 143 may use that information to determine that the network frame should be send to another of the network services 110, 111, 112 with less network load.

In one embodiment, one or more of the network services 110, 111, 112 encrypts or decrypts the received network frames before forwarding the processed network frame back to the flow aware navigator 141, 142, 143. In another embodiment, the network service 110, 111, 112 compresses the received network frame before forwarding the compressed network frame back to the flow aware navigator 141, 142, 143. In another embodiment, the network service 110, 111, 112 is configured to process Messaging Application Programming Interface (MAPI) related network frames. In another embodiment, the network service 110, 111, 112 may be configured to perform network analysis or statistics collection.

3.0 Example Flow Aware Navigator

Figure 2:
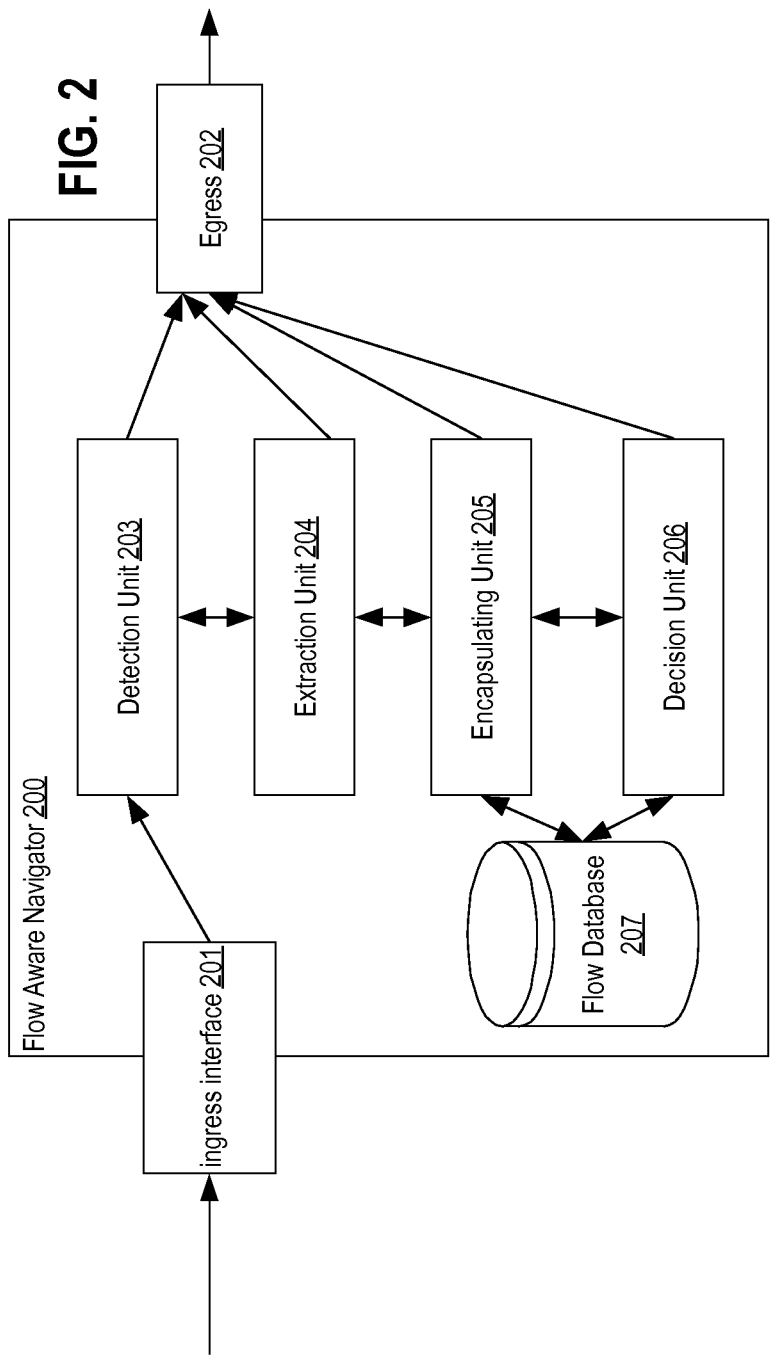
FIG. 2 illustrates an example computer-networking environment upon which an embodiment may be implemented.

FIG. 2 illustrates an example computer networking environment with which an embodiment of a flow aware navigator may be implemented. In one embodiment, a flow aware navigator 200 comprises an ingress interface 201, an egress interface 202, a detection unit 203, an extraction unit 204, an encapsulating unit 205, a decision unit 206 and a flow database 207. In one embodiment, ingress interface 201 may be configured to receive OSI layer 2 network frames or layer 3 network packets while the egress interface 202 may be configured to output layer 2 network frames or layer 3 network packets. In one embodiment, Flow aware navigator 200 passes packets or frames from one device to another. Flow aware navigator 200 may pass packets or frame between one or more of the client computers 100, 101, 102, one or more of the server computers 120, 121, 122, and one or more of the network services 110, 111, 112. In one embodiment, flow aware navigator 200 is in a cluster of flow aware navigators. The flow aware navigator 200 may have layer 2 adjacency to the other flow aware navigator. In another embodiment, the flow aware navigator 200 may have layer 3 adjacency to the other flow aware navigators.

In particular embodiments, flow aware navigator 200 is implemented in one or more computer programs, other software elements, components of hardware, or embedded logic, in a general-purpose computer or a special-purpose computer, or a combination of two or more such components residing at one or more network devices. In example embodiments, the flow aware navigator 200 forms part of a switch, a router, or any other suitable device that is capable of forwarding network traffic. In particular embodiments, flow aware navigator 200 includes or has access to one or more databases, file systems or storage devices capable of storing data. Although particular arrangements of the elements above are described and illustrated in FIG. 2 for purposes of illustrating a clear example, any suitable arrangement of the above modules may be used.

In one embodiment, flow aware navigator 200 includes a detection unit 203. In particular embodiments, an incoming network frame from ingress interface 201 is detected by the detection unit 203. In response to detecting an incoming network frame or packet, the detected network frame is sent to the extraction unit 204, which extracts or obtains the relevant network information from the packet or frame. For example, information such as source address, destination address, port, and/or any identifying information regarding the frame or packet payload may be extracted by the extraction unit 204.

In one embodiment, the extracted information is matched against the information stored in the flow database 207. In particular embodiments, flow database 207 may be in a permanent storage unit residing on a switch, router or any other suitable device configured to forward network traffic. In another embodiment, the flow database 207 may be located on a remote server, or a removable storage device that is communicatively coupled to the flow aware navigator 200. In certain embodiments, flow database 207 may be a hash table, a register, an array or any other suitable data storage. Flow database 207 may be part of the detection unit 203, extraction unit 204, encapsulating unit 205, or decision unit 206.

In one embodiment, the flow database 207 contains information indicating one or more network services 110, 111, 112 to which a particular network frame should be forwarded for processing. In one embodiment, whenever a new network frame is received by the flow aware navigator 200, the flow aware navigator adds a new entry to the flow database 207. In one embodiment, the flow aware navigator 200 may actively update the other flow aware navigators in the cluster of flow aware navigators with the new flow database entry. The update may be transmitted by a multicast layer 2 frame if the other flow aware navigators are layer 2 adjacent.

In another embodiment, the update may be transmitted by a multicast layer 3 frame. In an alternative embodiment, the update may be transmitted by a unicast layer 3 frame. In one embodiment, the flow aware navigator 200 may periodically update the other flow aware navigators within the same cluster of the flow database 207.

In one embodiment, whenever a new network frame is received, the flow aware navigator 200 may query other flow aware navigators in the cluster for information that matches the received network frame. If another flow aware navigator responds with information that indicates the new network frame matches an entry in its flow database, the flow database 207 of the flow aware navigator 200 is updated with the information from the other flow aware navigator.

In one embodiment, flow aware navigator 200 includes an encapsulating unit 205. Encapsulating unit 205 may be configured to encapsulate the received network frame with a new network frame, wherein the new network frame destination address is the same as the network address of the flow aware navigator 200. In another embodiment, the encapsulating unit 205 may be configured to encapsulate the received network frame with a new network frame, wherein the new network frame destination address is the same as the original received network frame destination address.

In one embodiment, flow aware navigator 200 includes a decision unit 206 that may be configured to determine whether a network frame should be forwarded to one or more of the network services 110, 111, 112 for processing. In one embodiment, decision unit 206 may query the network service policy 130 and determine from the one or more network policies in the network service policy 130 whether a network frame should be forwarded to one or more network services 110, 111, 112 for processing before forwarding it to the final destination.

4.0 Methods 4.1 Receiving a Network Frame from a Known Flow

Figure 3:
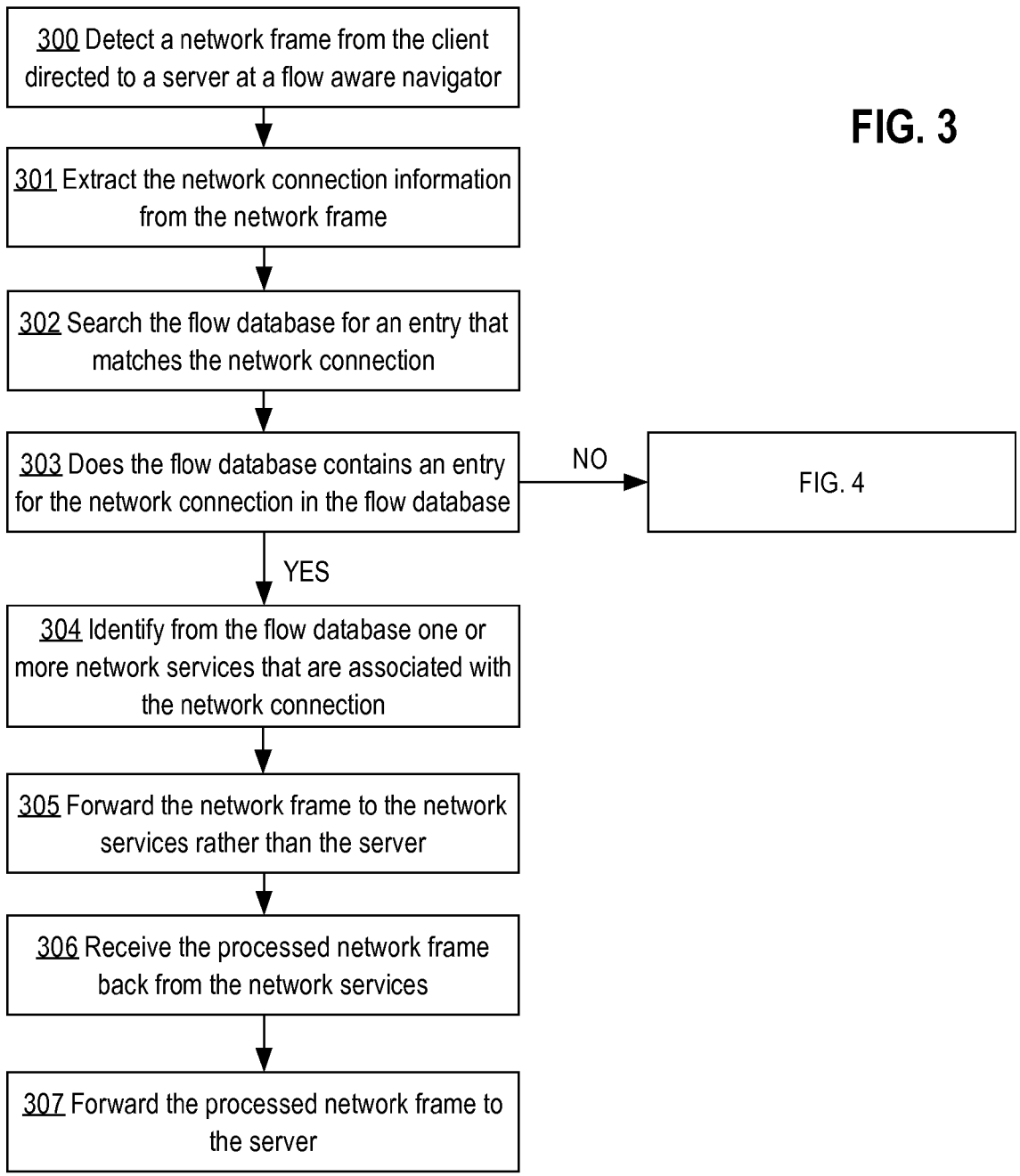
FIG. 3 illustrates an example of forwarding a network frame to a network service in block diagram form, according to an embodiment.

FIG. 3 illustrates an example of processing a known incoming network flow. For the purpose of explaining a clear example, the following description assumes that the process flow depicted by FIG. 3 is implemented by the flow aware navigator 200. In other embodiments, the broad techniques shown in FIG. 3 may be implemented in other functional units.

At block 300, the flow aware navigator 200 detects a network frame between one or more of the client computers 100, 101, 102 and one or more of the server computers 120, 121, 122. Since flow aware navigator 200 is a hop along the routing path between one or more of the client computers 100, 101, 102 and one or more of the server computers 120, 121, 122 and thus the flow aware navigator 200 is interposed between the one or more of the client computers 100, 101, 102 and one or more of the server computers 120, 121, 122, flow aware navigator 200 is able to intercept network frame before forwarding the network frame to the next hop.

At block 301, flow aware navigator 200 extracts the network connection information from the network frame detected at block 300. In one embodiment, flow aware navigator 200 extracts information such as the source network address, the destination network address and the network connection port from the network frame. In another embodiment, flow aware navigator 200 may also extract the payload information from the network frame.

At block 302, flow aware navigator 200 searches the flow database 207 for an entry in that matches the extracted network connection information from block 301.

At block 303, if flow aware navigator 200 determines that the extracted network connection information from block 301 matches an entry within the flow database 207, such embodiment proceeds to block 304. If the flow aware navigator 200 determines that the extracted network connection information from block 301 does not match any entry within the flow database 207, such embodiment proceeds directly to FIG. 4.

At block 304, flow aware navigator 200 identifies from the entry found within the flow database 207, one or more network services to process the network frame before the processed network frame is sent to the server.

At block 305, flow aware navigator 200 forwards the network frame to the one or more network services for processing rather than forwarding the network frame to the server. In one embodiment, the network service is configured to compress, encrypt, process the network frame before forwarding the processed network frame back to the flow aware navigator 200. In an alternative embodiment, the network service forwards the processed network frame directly to the server in block 307 rather than forwarding the network frame to the flow aware navigator 200.

In one embodiment, if two or more network services are identified from the entry found within the flow database 207, the flow aware navigator 200 may forward the network frame in a serial chain to the two or more network services. For example, the flow aware navigator 200 may forward the network frame to a first network service for processing, after the processed network frame is received at the flow aware navigator 200 from the first network service, the flow aware navigator 200 forwards the processed network frame to the second network service for processing. When the flow aware navigator 200 determines that the received network frame no longer needs to be processed by any other network services, control proceeds to 307. In an alternative embodiment, the flow aware navigator 200 may forward the network frame in a parallel chain by making copies of the network frame and forwarding the copied network frame to two or more network services at the same time. In one embodiment, the network service may consume the received network frame without forwarding a processed network frame back to the flow aware navigator 200. For example, a network service may consume the network frame for the purpose of network traffic data collection.

At block 306, flow aware navigator 200 receives the processed network frame from the network services.

At block 307, in response to receiving the processed network frame, flow aware navigator 200 forwards the processed network frame to the server.

4.2 Receiving a Network Frame from a Unknown Flow

Figure 4:
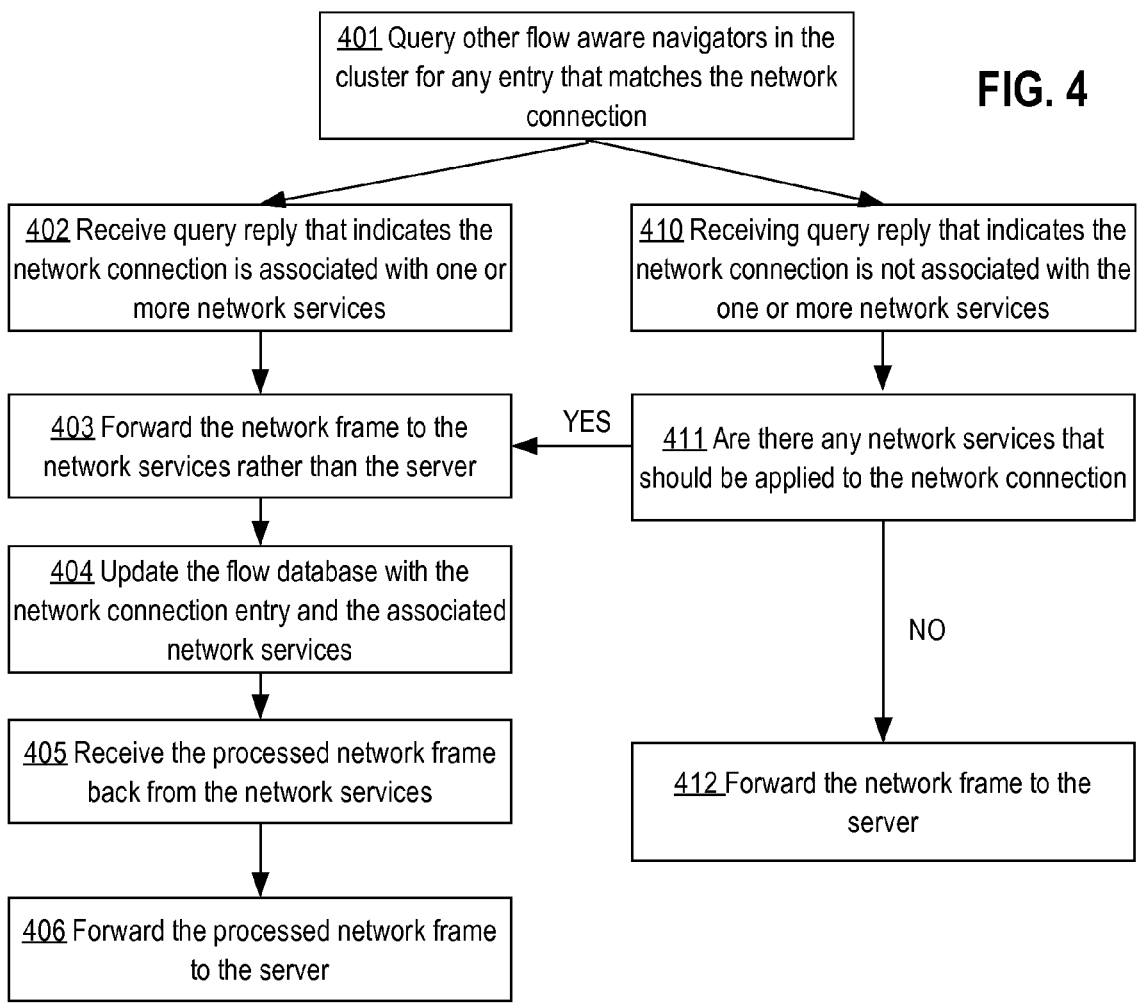
FIG. 4 illustrates an example of forwarding a network frame to a network service in block diagram form, according to an embodiment.

FIG. 4 illustrates an example of processing an unknown incoming network flow. For the purpose of explaining a clear example, the following description assumes that the process flow depicted by FIG. 4 is implemented by the flow aware navigator 200. In other embodiments, the broad techniques shown in FIG. 4 may be implemented in other functional units.

At block 401, the flow aware navigator 200 fails to match the extracted network connection information from block 301 to an entry within the flow database 207. In response to failing to find a match in the flow database 207, flow aware navigator 200 queries other flow aware navigators in the cluster of flow aware navigators for an entry that matches the extracted network connection information from block 301.

In one embodiment, the flow aware navigator 200 receives a reply from one of the other flow aware navigators that indicate the extract network connection information from block 301 matches an entry from another flow aware navigator, and control proceeds directly to block 402. Flow aware navigator 200 then identifies from the reply one or more network services that should process the network frame before forwarding the network frame to the server.

In an alternative embodiment, the flow aware navigator 200 receives a reply that indicates the extracted network connection information from block 301 does not match any other entries in any of the other flow aware navigators, and control proceeds directly to block 410.

At block 403, the flow aware navigator 200 forwards the network frame to the network services for processing rather than forwarding the network frame toward the server.

At block 404, the flow aware navigator 200 updates its own flow database 207 with the received reply from block 402.

At block 405, flow aware navigator 200 receives the processed network frame from the network services.

At block 406, in response to receiving the processed network frame, flow aware navigator 200 forwards the processed network frames toward the server.

At block 411, the flow aware navigator 200 determines one or more network services that should process the network frame before forwarding the network frame toward the server.

In one embodiment, the determination is based on one or more network policies. The network policies may indicate that the determination is based on the network address of the client computer sending the network frame, the network address of the server computer receiving the network frame, or the network port on which the network frame is established. In an alternative embodiment, the determination is based on a type of message payload carried within the network frame. For example, in response to determining that the network frame carries VoIP data, the flow aware navigator 200 may determine that the network frame should be forwarded directly toward the server without forwarding the network frame to any network services. In another example, in response to determining that the network frame carries a particular type of compressed data, the flow aware navigator 200 may determine that the network frame should be forwarded to a network service capable of uncompressing the data within the network frame before forwarding the uncompressed network frame toward the server. In one embodiment, the flow aware navigator 200 determines that the network frame should be forwarded to a network service for processing before forwarding the network frame to the server, and control proceeds directly to block 403. In another embodiment, the flow aware navigator 200 updates all of the other flow aware navigators with the information that the network frame should be forwarded to a network service before forwarding the network frame toward the server.

If the flow aware navigator 200 determines that the network frame should not be forwarded to any network services for processing before forwarding the network frame toward the server, control proceeds directly to block 412. At block 412, the flow aware navigator 200 forwards the unprocessed network frame toward the server.

5.0 Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
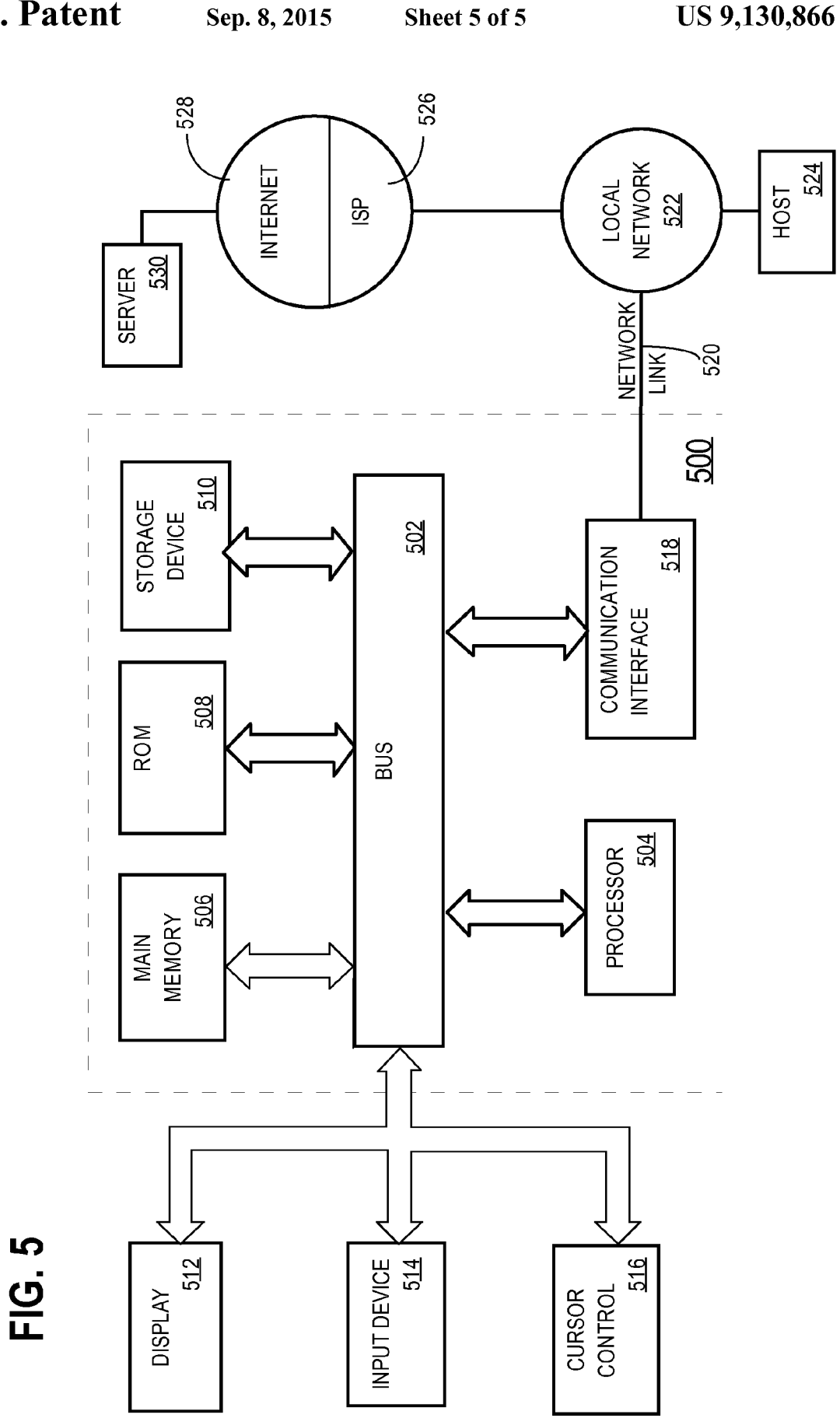
FIG. 5 is a block diagram that illustrates a computer system upon which an embodiment may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

5.0 Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A data processing apparatus configured as a flow aware navigator, comprising:
    one or more electronic digital processors;
    a switching system coupled to the one or more processors and configured to receive network frames on ingress interfaces and to route or forward the network frames on one or more selected egress interfaces;
    a flow database coupled to the one or more electronic digital processors configured to store one or more entries, wherein each entry identifies one or more network connections and one or more network services;
    a network channel response unit coupled to the one or more processors and comprising a non-transitory computer-readable medium storing one or more sequences of instruction which when executed cause the one or more processors to perform:
    receiving a particular network frame from a client computer directed toward a server computer that is a final destination of the particular network frame;
    extracting, from the particular network frame, information that identifies a first network connection associated with the client computer and the server computer;
    determining, from the flow database, whether the information that identifies the first network connection matches a first entry in the flow database;
    in response to determining that the information that identifies the first network connection does match the first entry in the flow database: identifying one or more first network services that correspond, in the flow database, to the first entry; forwarding the particular network frame to the one or more first network services without forwarding the particular network frame toward the server computer; receiving, in response, one or more processed network frames from the one or more first network services; after receiving the one or more processed network frames from the one or more first network services, forwarding the one or more processed network frames toward the server computer;
    in response to determining that the information that identifies the first network connection does not match the first entry in the flow database, querying one or more flow aware navigators within a cluster of flow aware navigators for a second entry that matches the first network connection.

2. The apparatus of claim 1, further comprising sequences of instructions which when executed cause the one or more processors to perform:
    in response to receiving, from a particular first network service of the one or more first network services, a signal to stop forwarding network frames to the particular first network service, forwarding all subsequent network frames toward the server computer rather than to the particular first network service;

removing, from the flow database, the first entry that matches the information that identifies the first network connection.

3. The apparatus of claim 1, further comprising sequences of instructions which when executed cause the one or more processors to perform:

in response to receiving a query reply comprising the second entry that matches the information that identifies the first network connection, identifying, from the second entry, one or more second network services;

adding, to the flow database, the second entry that identifies the first network connection and the one or more second network services;

forwarding the particular network frame to the one or more second network services, without forwarding the particular network frame toward the server computer, and receiving one or more processed network frames from the one or more second network services in response;

after receiving all of the one or more processed network frames, forwarding the one or more processed network frames toward the server computer.

4. The apparatus of claim 1, further comprising sequences of instructions which when executed cause the one or more processors to perform:

receiving one or more query replies that indicate the information that identifies the first network connection is not found in the one or more flow aware navigators within the cluster of the flow aware navigators;

determining, from one or more network policies stored in the flow database, one or more third network services;

adding, to the flow database, a third entry that identifies the first network connection and the one or more third network services;

forwarding the particular network frame to the one or more third network services, without forwarding the particular network frame toward the server computer, and receiving one or more processed network frames from the one or more third network services in response;

after receiving all of the one or more processed network frames, forwarding the one or more processed network frames toward the server computer.

5. The apparatus of claim 4, wherein the one or more network policies specify the one or more third network services to process any of: voice over Internet Protocol (VoIP), compressed, encrypted, Messaging Application Programming Interface (MAPI), multimedia, ftp or http network frames.

6. The apparatus of claim 1, further comprising sequences of instructions which when executed cause the one or more processors to perform:

determining, from one or more network policies stored in the flow database, that no network services are configured to process the particular network frame before the server computer;

in response thereto, forwarding the particular network frame toward the server computer.

7. The apparatus of claim 4, further comprising sequences of instructions which when executed cause the one or more processors to perform updating all of the flow aware navigators in the cluster of flow aware navigators with the updated flow database, wherein the updated flow database comprises the added third entry that identifies the first network connection and the one or more third network services.

8. The apparatus of claim 4, further comprising sequences of instructions which when executed cause the one or more processors to perform determining, from the extracted information that identifies the particular network frame, the one or more third network services to process the particular network frame before the server computer.

9. The apparatus of claim 1, wherein the one or more first network services comprise any of compression, quality of service, optimization, firewall, encryption, decryption and statistical analysis functions.

10. A method, comprising:

receiving a particular network frame from a client computer directed toward a server computer that is a final destination of the particular network frame;

extracting, from the particular network frame, information that identifies a first network connection associated with the client computer and the server computer;

determining, from a flow database that stores one or more entries that identify one or more network connections and one or more network services, whether the information that identifies the first network connection matches a first entry in the flow database;

in response to determining that the information that identifies the first network connection does match the first entry in the flow database: identifying one or more first network services that correspond, in the flow database, to the first entry; forwarding the particular network frame to the one or more first network services without forwarding the particular network frame toward the server computer; receiving, in response, one or more processed network frames from the one or more first network services; after receiving the one or more processed network frames from the one or more first network services, forwarding the one or more processed network frames toward the server computer;

in response to determining that the information that identifies the first network connection does not match the first entry in the flow database, querying one or more flow aware navigators within a cluster of flow aware navigators for a second entry that matches the first network connection.

11. The method of claim 10, further comprising:

in response to receiving, from a particular first network service of the one or more first network services, a signal to stop forwarding network frames to the particular first network service, forwarding all subsequent network frames toward the server computer rather than to the particular first network service;

removing, from the flow database, the first entry that matches the information that identifies the first network connection.

12. The method of claim 10, further comprising:

in response to receiving a query reply comprising the second entry that matches the information that identifies the first network connection, identifying, from the second entry, one or more second network services;

adding, to the flow database, the second entry that identifies the first network connection and the one or more second network services;

forwarding the particular network frame toward the one or more second network services, without forwarding the particular network frame to the server computer, and receiving one or more processed network frames from the one or more second network services in response;

after receiving all of the one or more processed network frames, forwarding the one or more processed network frames toward the server computer.

13. The method of claim 10, further comprising sequences of instructions which when executed cause one or more processors to perform:
- receiving one or more query replies that indicate the information that identifies the first network connection is not found in the one or more flow aware navigators within the cluster of the flow aware navigators;
- determining, from one or more network policies stored in the flow database, one or more third network services;
- adding, to the flow database, a third entry that identifies the first network connection and the one or more third network services;
- forwarding the particular network frame to the one or more third network services, without forwarding the particular network frame toward the server computer, and receiving one or more processed network frames from the one or more third network services in response;
- after receiving all of the one or more processed network frames, forwarding the one or more processed network frames toward the server computer.

14. The method of claim 13, wherein the one or more network policies specify the one or more third network services to process any of: voice over Internet Protocol (VoIP), compressed, encrypted, Messaging Application Programming Interface (MAPI), multimedia, ftp or http network frames.

15. The method of claim 10, further comprising:
- determining, from one or more network policies stored in the flow database, that no network services are configured to process the particular network frame before the server computer;
- in response thereto, forwarding the particular network frame toward the server computer.

16. The method of claim 13, further comprising:
- updating all of the flow aware navigators in the cluster of flow aware navigators with the updated flow database, wherein the updated flow database comprises the added third entry that identifies the first network connection and the one or more third network services.

17. The method of claim 13, further comprising determining, from the extracted information that identifies the particular network frame, the one or more third network services to process the particular network frame before the server computer.

18. The method of claim 10, wherein the one or more first network services comprise any of compression, quality of service, optimization, firewall, encryption, decryption and statistical analysis functions.

19. A non-transitory computer readable media storing computer executable instructions, the instructions performing steps comprising:
- receiving a particular network frame from a client computer directed toward a server computer that is a final destination of the particular network frame;
- extracting, from the particular network frame, information that identifies a first network connection associated with the client computer and the server computer;
- determining, from a flow database that stores one or more entries that identify one or more network connections and one or more network services, whether the information that identifies the first network connection matches a first entry in the flow database;
- in response to determining that the information that identifies the first network connection does match the first entry in the flow database: identifying one or more first network services that correspond, in the flow database, to the first entry; forwarding the particular network frame to the one or more first network services without forwarding the particular network frame toward the server computer; receiving, in response, one or more processed network frames from the one or more first network services; after receiving the one or more processed network frames from the one or more first network services, forwarding the one or more processed network frames toward the server computer;
- in response to determining that the information that identifies the first network connection does not match the first entry in the flow database, querying one or more flow aware navigators within a cluster of flow aware navigators for a second entry that matches the first network connection.

20. The non-transitory computer readable media of claim 19, wherein the instructions further comprising:
- in response to receiving, from a particular first network service of the one or more first network services, a signal to stop forwarding network frames to the particular first network service, forwarding all subsequent network frames toward the server computer rather than to the particular first network service;
- removing, from the flow database, the first entry that matches the information that identifies the first network connection.

21. The non-transitory computer readable media of 19, wherein the instructions further comprising:
- in response to receiving a query reply comprising the second entry that matches the information that identifies the first network connection, identifying, from the second entry, one or more second network services;
- adding, to the flow database, the second entry that identifies the first network connection and the one or more second network services;
- forwarding the particular network frame to the one or more second network services, without forwarding the particular network frame toward the server computer, and receiving one or more processed network frames from the one or more second network services in response;
- after receiving all of the one or more processed network frames, forwarding the one or more processed network frames toward the server computer.

22. The non-transitory computer readable media of 19, wherein the instructions further comprising:
- receiving one or more query replies that indicate the information that identifies the first network connection is not found in the one or more flow aware navigators within the cluster of the flow aware navigators;
- determining, from one or more network policies stored in the flow database, one or more third network services;
- adding, to the flow database, a third entry that identifies the first network connection and the one or more third network services;
- forwarding the particular network frame to the one or more third network services, without forwarding the particular network frame toward the server computer, and receiving one or more processed network frames from the one or more third network services in response;
- after receiving all of the one or more processed network frames, forwarding the one or more processed network frames toward the server computer.

23. The non-transitory computer readable media of claim 22, wherein the one or more network policies specify the one or more third network services to process any of: voice over Internet Protocol (VoIP), compressed, encrypted, Messaging Application Programming Interface (MAPI), multimedia, ftp or http network frames.

24. The non-transitory computer readable media of 19, wherein the instructions further comprising:
   determining, from the one or more network policies stored in the flow database, that no network services are configured to process the particular network frame before the server computer;
   in response thereto, forwarding the particular network frame to the server computer.

\* \* \* \* \*